Patented Apr. 1, 1930

1,752,867

UNITED STATES PATENT OFFICE

LOUIS J. TROSTEL, OF BALTIMORE, MARYLAND, ASSIGNOR TO GENERAL REFRACTORIES COMPANY, OF PHILADELPHIA, PENNSYLVANIA, A CORPORATION OF PENNSYLVANIA

REFRACTORY COMPOSITION AND PROCESS OF MAKING REFRACTORY ARTICLES THEREFROM

No Drawing.　　　Application filed March 30, 1927.　Serial No. 179,720.

This invention relates to a new and improved refractory composition and process for manufacturing same.

The process consists in adding to a body mix of a mineral, a member having a very stable crystalline and chemical form at elevated temperatures. This member becomes a fractional part of the mix, but its incorporation enables the material to be wetted and shaped and thereafter dried and burned without either loss of shape, or material loss of volume, within the range of very high temperatures such as are developed in industrial furnaces.

The object of the invention is to provide a brick or other molded article of the super-refractory class of highly aluminous content that will not continue to suffer appreciable volume changes in service at temperatures at or above the temperatures employed in burning the brick in the usual course of manufacture.

Another object is to provide such brick by a method of manufacture which consists in introducing a suitable quantity of the mineral mullite, into a brick mix consisting of one or more of the hydrous oxide of aluminum minerals, diaspore, bauxite, or gibbsite, which may be mixed together in the raw or calcined state, or both states simultaneously.

Another object is to provide such brick by introducing a highly refractory mineral which because of inherent stable crystalline and chemical properties at elevated temperatures suffers no appreciable change in volume and thus furnishes to the brick in general a rigid skeleton or crystalline framework on which the grains of the mineral diaspore, bauxite, or gibbsite, may coalesce or condense. This condensation of the diaspore, bauxite, or gibbsite grains proceeds with increasing intensity of temperature and with increasing number of exposures to elevated temperatures.

It is a well-known fact that these particular hydrous oxides of aluminum mentioned, that is the minerals diaspore, bauxite, and gibbsite, show an unusually high shrinkage upon heating at elevated temperatures when compared with the hydrous aluminum silicates or ordinary fireclays, and that this extremely high firing shrinkage has prevented the more general use of these materials for refractory purposes. Phelps, in the Journal of the American Ceramic Society 10, 659 (1926), has shown from microscopic examination that the typical diaspore oolites for instance consist of comparatively large amorphous grains. Upon heating repeatedly at around 1400° C., the rather large amorphous grains start crystallizing into a dense mass with an accompanying high shrinkage. This shrinkage was further verified by showing that there is an accompanying increase in specific gravity as the crystallization proceeds. The shrinkage due to the removal of chemically and mechanically contained water is negligible by comparison.

The naturally occurring hydrous oxides of aluminum, such as diaspore and gibbsite, have the molecular chemical formula of $Al_2O_3.H_2O$, and $Al_2O_3.3H_2O$ respectively. Bauxite is generally considered a mixture of the two oxides mentioned and the molecular chemical formula is accordingly given as $Al_2O_3.2H_2O$. Some small amount of accessory fireclay will at times accompany these oxides as an impurity. The specific gravity of pure diaspore is 3.3 to 3.5. However it is not unusual practice to mine diaspore of a specific gravity of 3.4, indicating the high purity of the mineral available for refractory purposes.

This conception of the hydrous oxides of aluminum will serve to distinguish them from ordinary fireclay, which is generally accepted as consisting of one or more of the hydrous aluminum silicates. The molecular chemical formula of fireclay is approximately $Al_2O_3.2SiO_2.2H_2O$, i. e. that of kaolinite. The usual fireclays do not exhibit the property of extremely high firing shrinkage as do the minerals diaspore, bauxite and gibbsite, as the comparative porosities of typical sound commercial refractories made from the mineral diaspore on one hand and from the usual fireclays on the other hand will indicate, i. e. diaspore about 30–35%, fireclay 10–15%. This rather small firing shrinkage in fireclay is not a function of shrinkage of large amorphous grains to small crystalline grains as in, say diaspore, but is due largely to the vitrification which results from the formation of siliceous glasses. Neither do the usual fireclays possess the high specific gravity of, say diaspore, because of their different chemical and crystalline composition. The specific gravity of fireclay, for instance, is about 2.6.

In the usual process of manufacture of refractory bricks from the hydrous oxides of aluminum, it is customary to mix with the raw diaspore, for instance, a certain amount of calcined diaspore, which has been burned sufficiently to have an approximate stable grain size. The introduction of the calcined portion is made for the purposes of attempting to control shrinkage in subsequent burning of the whole batch. The raw and calcined portions of the batch are generally ground separately or together, to the usual fineness for firebrick manufacture, tempered with water and then pressed into brick by hand molding or machines. Following this, these bricks are dried to remove mechanically contained moisture and burned at a temperature which causes further shrinkage.

It is impossible by the usual burning treatment in practice to remove all shrinkage of brick made from the hydrous oxides of aluminum. It is further impractical to attempt to do so by increased temperature and time of burning alone, because of the fuel expense, increased kiln repairs, lowered production and because of certain other undesirable reactions which would take place in the brick.

It is further impractical to eliminate this shrinkage by the introduction of very large amounts of calcined diaspore for instance, because of the difficulties in molding, which causes an extremely poorly bonded brick so friable it will not stand handling. Further, the use of a large amount of calcined diaspore for instance, is no insurance against shrinkage, because the calcined diaspore still has some shrinkage in it, due to the fact that the practical temperature of calcination is rarely high enough to shrink the amorphous diaspore to its ultimate stable crystalline grain size.

Accordingly, bricks made from the hydrous oxides of aluminum continue to shrink when exposed to sufficiently high temperatures in industrial furnaces, resulting at times in collapse of arches, spalling and slag penetration and attack of the brick.

I have found that small percentages of the mineral mullite ground to approximately the same screen size as the usual mix and added in proper proportions into a brick mix consisting of, say diaspore, will produce a burned brick of practically constant volume and that this brick of new composition will maintain a practically constant volume over a temperature range comparable with that which these brick will ordinarily be subjected to in industrial furnaces.

By mullite, I refer to either the naturally occuring mineral as found on the island of Mull as described by Thomas in the Quar. Jour. Geol. Soc. 78, 229 (1922) and which has the molecular chemical formula of $$3Al_2O_3.2SiO_2,$$

or to the end product formed by merely heating to about 1400° C. one of the naturally occurring minerals, cyanite, sillimanite, and andalusite, all of which have the same molecular chemical formula $Al_2O_3.SiO_2$, but different optical and crystalline characteristics. These properties are described by Greig in the Jour. Amer. Cer. Soc. 8, 465 (1925) and by Peck in the same journal 8, 407 (1925).

Of the various aluminum silicates, mullite has the most stable crystalline and chemical form at elevated temperatures. Its melting temperature, for instance, is 1810° C., which is quite in excess of that of the ordinary aluminum silicates of the kaolinite type. Mullite accordingly shows no radical changes in expansion or contraction over the working temperature range of most refractories, 1400–1700° C., and should make an ideal reenforcing medium in a refractory mix which suffers from change in shape or volume due to the type of shrinkage described as characteristic of the hydrous oxides of aluminum.

Its introduction therefore in small percentages into a mix of one of the hydrous oxides of aluminum, as diaspore, is to provide a very stable skeleton or crystalline framework, onto which the amorphous grains of diaspore may condense at kiln and furnace temperatures. The net effect is to produce a brick or other molded article of apparently and for all practical purposes of constant volume.

The mixture I have found most satisfactory for a brick made from the mineral diaspore for instance, which is the highest in alumina content of the hydrous oxides of alumina, is about 60 to 70% of the crude mineral, 20 to 30% calcined diaspore and about 10% mullite.

While the above mixture is the preferred one, it is to be understood that the proportions and character of the ingredients may be changed. The proportions of the mullite for instance may be varied from 2 to 20%, depending upon the amount of calcined diaspore in the brick mix. I also anticipate the use of dumortierite as a source of mullite, and do not limit myself to the use of the natural mineral mullite, or such minerals as cyanite, andalusite and sillimanite.

Referring to the use of dumortierite, I have found that this material can be used as a possible source of mullite, providing that a cheap supply of the raw material becomes available.

It is to be noted particularly, that the process provides, preferably, for the direct introduction into the batch mixture of mullite, as such, instead of a material which under the firing treatment of the batch will produce mullite. Although the invention, in some aspects, is not to be considered as limited to the use of mullite as such, i. e., either natural mullite or mullite obtained by the processing of such materials as cyanite, andalusite and sillimanite, there is a distinct advantage, as will be understood from the foregoing description, in employing this material initially instead of depending upon the treatment of the entire batch to produce it.

Among the advantages of using the artificial mullite in the batch initially instead of depending upon the treatment of a batch containing a mullite forming mineral are:

1. Complete conversion to mullite can be more efficiently and completely effected by a separate heat treatment of the raw materials (e. g. cyanite, andalusite and sillimanite) outside of the batch. When the raw materials are dispersed as a fractional part of the batch, it is doubtful at times whether or not complete conversion occurs. This separate processing insures a more uniform and dependable material.

2. In the formation of mullite by heating, from one of the group of sillimanite minerals, there is set free a molecule of silica which is present as either free silica in one of its crystalline modifications, such as quartz, cristobalite and tridymite, or as silica glass. This free silica adds undesirable qualities to the batch in that it increases the spalling properties of the finished product, and decreases the load bearing properties at elevated temperatures. By forming mullite outside of the batch, the necessary purification processes can be made to insure a mullite of more constant purity.

3. The temperature necessary to convert sillimanite to mullite occasionally must be carried out to 1545 degrees centigrade. This is in excess of the temperature necessary to burn the rest of the batch. Fuel economy is therefore effected by separately heating only the relatively small amount of sillimanite to 1545 degrees centigrade to form mullite, and then heating the final batch to the usual temperature of only about 1400° centigrade.

It is found that mullite obtained from cyanite, andalusite and sillimanite is especially effective.

It is to be understood that the invention comprehends a body mix consisting of one or more of a group of hydrous oxides of alumina minerals comprising diaspore, bauxite, or gibbsite, to which is added an appropriate amount of mullite, and that one of the uses of this batch is in the manufacture of bricks by suitably wetting the mass and shaping and heat treating to form the desired product.

This application is a continuation in part of my co-pending application, Serial No. 114,307 filed June 7, 1926, entitled "Process for making refractory compositions and articles therefrom".

In the appended claims, it will be understood that the term "a hydrous oxide of aluminum" is to be construed as meaning one or more of the hydrous oxides of the aluminum minerals, since in some cases it may be desirable to use, for example, any two of the minerals to form the batch or any three of the minerals to form the batch, and applicant does not wish to be considered as claiming a batch comprising but a single one of these materials.

Referring to the shrinkage of the mass in the appended claims, it will be understood that the use of the word "mass" is employed to mean the body containing the hydrous oxides of aluminum and mullite as a whole.

What I claim is:—

1. A batch mixture for forming refractory bodies, containing a hydrous oxide of aluminum and sufficient mullite to prevent the shrinkage of the mass during firing.

2. A batch mixture for forming refractory bodies containing a hydrous oxide of aluminum and 2 to 20% mullite to prevent shrinkage of the mass during firing.

3. The process of making refractory compositions which consists in adding to a mix containing a hydrous oxide of aluminum, sufficient mullite to prevent the shrinkage of the mass during firing, shaping the mass and subjecting it to heat, whereby a crystalline mineral skeleton stable at elevated temperature is built up.

4. An article having the properties of retaining its substantial shape and volume and composed of a major mass of a hydrous oxide of aluminum and a smaller quantity of mullite.

5. The process of making refractory compositions which consists in adding to a batch comprising hydrous oxide of aluminum sufficient mullite to form a crystalline skeleton upon which the batch material will condense during firing of the mass.

In testimony whereof I have hereunto set my hand.

LOUIS J. TROSTEL.